(12) United States Patent
Ishizuka (10) Patent No.: US 6,341,108 B1
(45) Date of Patent: Jan. 22, 2002

(54) AUDIO REPRODUCING DEVICE

(75) Inventor: Satoru Ishizuka, Tokyo (JP)

(73) Assignee: Aiwa Co., Ltd. (JP)

( * ) Notice: Subject to any disclaimer, the term of this patent is extended or adjusted under 35 U.S.C. 154(b) by 0 days.

(21) Appl. No.: 09/380,273

(22) PCT Filed: Mar. 28, 1997

(86) PCT No.: PCT/JP97/01081

§ 371 Date: Aug. 27, 1999

§ 102(e) Date: Aug. 27, 1999

(87) PCT Pub. No.: WO98/44509

PCT Pub. Date: Oct. 8, 1998

(51) Int. Cl.[7] .................................................. G11B 7/00
(52) U.S. Cl. .................... 369/47.1; 369/53.41; 369/59.1
(58) Field of Search ............................. 369/47.1, 47.11, 369/47.13, 47.15, 53.1, 53.11, 53.2, 53.41, 59.1, 124.01, 32, 275.1, 275.3, 53.44

(56) References Cited

U.S. PATENT DOCUMENTS 5,721,724 A * 2/1998 Taira et al. ............... 369/275.3
6,128,434 A * 10/2000 Hirayama et al. ............ 386/97

FOREIGN PATENT DOCUMENTS

| EP | 0459157 | 12/1991 |
|----|---------|---------|
| JP | 60-91788 | 5/1985 |
| JP | 1-150170 | 6/1989 |
| JP | 4-13287 | 1/1992 |
| JP | 4-324871 | 11/1992 |
| JP | 5-27787 | 2/1993 |
| JP | 8-125788 | 5/1996 |

* cited by examiner

*Primary Examiner*—Muhammad Edun
(74) *Attorney, Agent, or Firm*—Parkhurst & Wendel, L.L.P.

(57) ABSTRACT

A sound reproducing device that displays character information in languages corresponding to a user's wishes without increasing a burden on the user. The user sets an order of priority of the languages in which the character information is displayed when a CD is reproduced. For example, a code "69" (=Japanese) is set as a first priority. Then, when the CD is reproduced, based on the order of priority set in advance, the character information represented by the language with the highest priority among the character information recorded on the CD is displayed on a LCD (19). By setting the order of priority in advance, there is no longer any need of setting at each reproduction of the CD and the character information is displayed on the LCD (19) in the languages desired by the user.

24 Claims, 7 Drawing Sheets

ENTER LANGUAGE CODE

2 — ENGLISH

AUDIO REPRODUCING DEVICE

FIELD OF THE INVENTION

This invention relates to a sound reproducing device, particularly to a sound reproducing device intended for a recording medium on which sound information and character information represented by one or more languages are recorded so that the sound information is reproduced and the character information is displayed on a display portion.

The character information described above includes not only characters but also numeric characters and symbols, and should be identified as what is called text data.

BACKGROUND ART

Whether domestically produced or imported, a large number of compact discs (CDs) on which music programs are recorded are conventionally sold. Users reproduce the music programs recorded on the CDs by utilizing CD players.

It is prescribed that this kind of CD should be 120 mm in diameter. The music program is recorded in an area whose inside diameter is 50 mm and whose outside diameter is 116 mm. When the music program is reproduced, operations such as start and termination of reproduction are controlled by detecting the areas before and behind the above area, that is, an area called a lead-in which is inside of the diameter of 50 mm and an area called a lead-out which is outside of the diameter of 116 mm.

In the meantime, a technique called CD-TEXT has been proposed recently for recording the character information regarding the music program that is recorded on the CD in the lead-in area and the program area of the CD so that the character information is displayed in a predetermined display portion when the music program is reproduced. This technique allows the user to listen to the music program while looking at the character information displayed in the display portion.

Moreover, the character information represented by a maximum of eight types of languages can be recorded.

In the present situation, however, a technique to display the recorded character information, which is represented by a plurality of languages, in the languages desired by the user has not been established yet. Therefore, a technique that allows the user to choose his desired languages and allows the character information to be displayed in the desired languages has been awaited.

On the other hand, if the user has to choose his desired languages each time the CD is reproduced, there is a possibility of increasing the user's burden of operation, thereby causing inconvenience.

DISCLOSURE OF THE INVENTION

The present invention is made to solve the above problems, and the object of the present invention is to provide a sound reproducing device that is able to display character information in languages corresponding to a user's wishes without increasing the burden on the user.

In order to achieve the above object, the present invention is a sound reproducing device intended for a recording medium on which sound information and character information represented by one or more languages are recorded so that the sound information is reproduced and the character information is displayed on a display portion, comprising priority order setting means for setting in advance an order of priority of languages in which the character information is displayed, and control means for displaying the character information on the display portion by reading out the character information from the recording medium on a basis of the order of priority set by the priority order setting means. According to the present invention, the user sets in advance the order of priority of the languages in which the character information is displayed by the priority order setting means. Here, a case in which only one language is set is also included. In other words, this case is considered as the case wherein only the language of the first priority is set. Then, when the sound information recorded on the recording medium is reproduced, the control means reads out the character information from the recording medium on the basis of the set order of priority so that the read-out character information is displayed on the display portion. In this way, if the user sets in advance the order of priority of the languages in which the character information is displayed, there is no need to set his desired languages every time the sound information is reproduced. In addition, the character information represented by the desired languages is displayed on the display portion based on the order of priority set in advance. Therefore, the display of the character information in the languages corresponding to the user's wishes can be made without increasing the burden on the user.

In this case, if it is configured in such a manner that an internationally common code established in advance in correspondence to each language is used when the user set the order of priority of the languages by the priority order setting means, the configuration relating to the entry, interpretation and the like of the codes in the priority order setting means can also be used commonly throughout the world, thereby obviating the trouble of changing the configuration of the priority order setting means for each country in which it is used.

Further, as there may be some cases in which the character information represented by the languages specified in the order of priority is not recorded on the recording medium to be reproduced, it is preferable that the control means displays on the display portion the purport that the character information cannot be displayed. Thus, the user can instantly recognize that the character information cannot be displayed.

Moreover, it is preferable that the control means displays on the display portion the types of languages in which the character information is recorded on the recording medium to be reproduced. Thus, the user can instantly recognize the types of languages in which the character information is recorded on the recording medium.

Additionally, it is preferable that when the languages in which the character information is displayed are specified individually by an individual specification means, the control means gives precedence to the individually specified languages over the order of priority set in advance, in reading out the character information from the recording medium and displaying the read-out character information on the display portion. Thus, even if the character information represented by the languages specified in the order of priority is not recorded on the recording medium, it is possible to specify other languages so that the character information represented by the specified languages is displayed on the display portion.

As one of the recording media on which the sound information and the character information represented by one or more languages are recorded, a compact disc (CD) can be cited. However, the above recording media also include a minidisc (MD), a digital audio tape (DAT) and the like.

BEST MODES FOR CARRYING OUT THE INVENTION

An embodiment according to the present invention will be described hereinafter with reference to the drawings.

Figure 1:
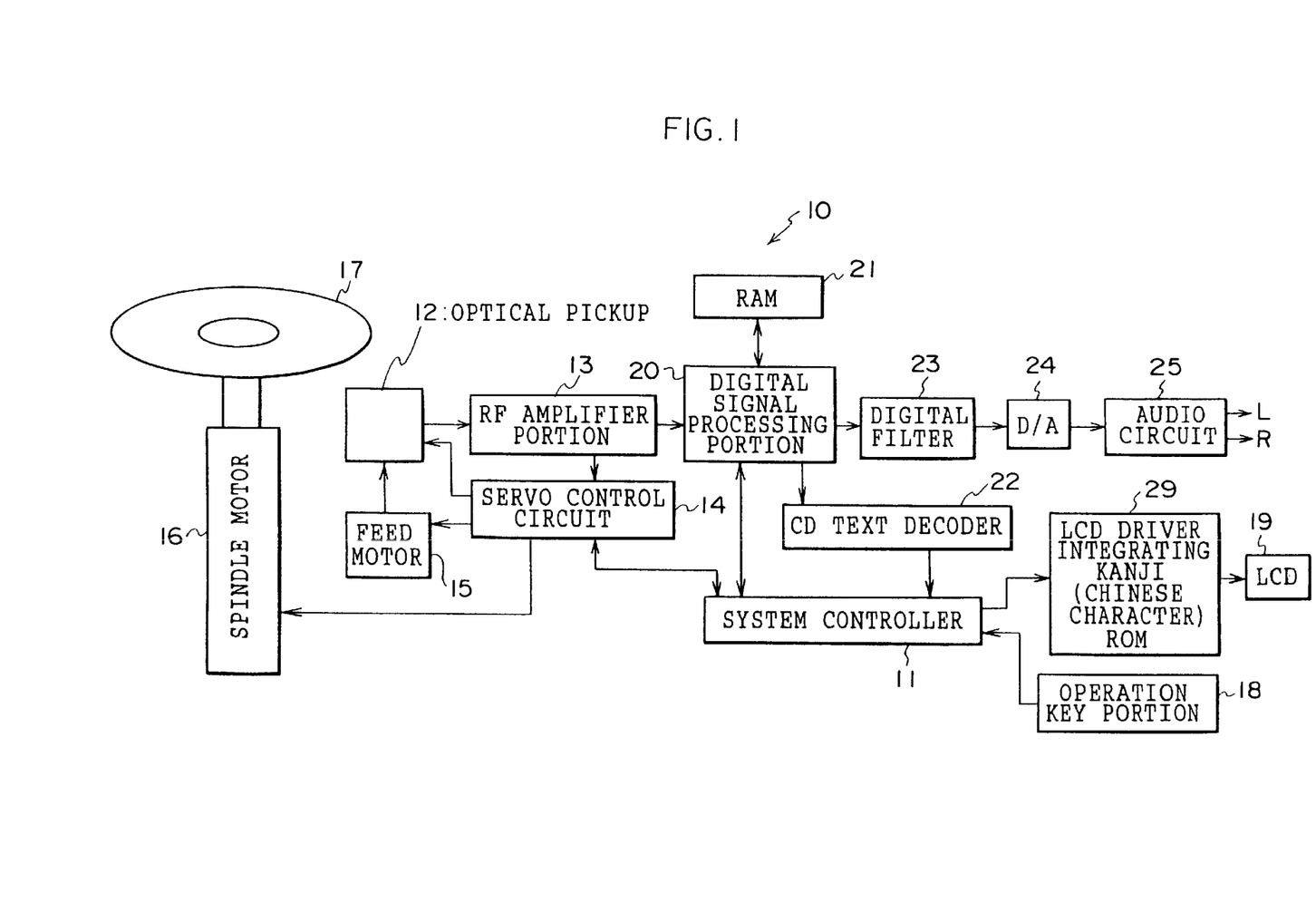
FIG. 1 is a schematic structural view of a CD player according to an embodiment of the present invention.

FIG. 1 illustrates a schematic structural view of a compact disc reproducing device (referred to as a CD player, hereinafter) 10 applied to the present invention. As shown in FIG. 1, in the CD player 10, a compact disc (CD) 17, on which a music program and character information represented by one or more languages are recorded, is set in a predetermined position. The CD 17 that is set is rotated by a spindle motor 16.

An optical pickup 12 for reading out information (the music program, the character information, and the like) recorded on a recording surface of the CD 17 is provided in the CD player 10. The structure of the optical pickup 12 includes a semiconductor laser for emitting laser radiation toward the CD 17, a photoreceptive element for receiving light reflected from the CD 17, and an APC circuit for controlling a driving current that is supplied to the semiconductor laser in such a manner that the radiation amount of the laser is constant. In the optical pickup 12, the laser radiation is emitted from the above-described semiconductor laser to the recording surface of the CD 17, so that information recorded on the recording surface is read out based on variation in the reflected radiation amount thereof.

Further, focus error signals for indicating that a distance between the optical pickup 12 and the recording surface of the CD 17 has changed, and tracking error signals for indicating tracking errors of the recording surface of the CD 17 are outputted to a RF amplifier portion 13 from the optical pickup 12 so that they are inputted to a servo control circuit 14 after being amplified in the RF amplifier portion 13. The servo control circuit 14 carries out focus position adjusting control (focus servo) of the optical pickup 12 based on the focus error signals and tracking servo of the optical pickup 12 based on the tracking error signals. The servo control circuit 14 also controls an operation of a feed motor 15 that moves the optical pickup 12 along the direction of a radius of the CD 17 (driving a sliding type of movement). This type of operation of the servo control circuit 14 is controlled by a system controller 11, with which a microcomputer is integrated.

On the other hand, digital signals, which represent the music program and the character information and which are read out from the recording surface, are outputted to the RF amplifier portion 13 from the optical pickup 12 so that they are inputted to a digital signal processing portion 20 after being amplified in the RF amplifier portion 13. In the digital signal processing portion 20, processing such as error correction of the inputted digital signals is carried out. A RAM 21 is used as a storage area for processing operations in the digital signal processing portion 20.

Among the digital signals whose processing in the digital signal processing portion 20 has been completed, digital signals that represent the music program (digital audio signals) are inputted to a D/A converter 24 via a digital filter 23. After being converted into analog audio signals by the D/A converter 24, the digital audio signals are outputted from output terminals (left (L) and right (R)) of the audio circuit 25.

On the other hand, among the digital signals whose processing in the digital signal processing portion 20 has been completed, digital signals that represent the character information (digital text signals) are inputted to the system controller 11 after decoding processing has been carried out with a CD text decoder 22. The digital text signals that have been decoding processed are outputted to a LCD driver integrating kanji (Chinese characters) ROM 29 under the control of the system controller 11. Then, the character information represented by the digital text signals is displayed on a liquid crystal display (LCD) 19.

The system controller 11 has a function of controlling an operation of each component shown in FIG. 1. An operation key portion 18 for a user to carry out priority order setting processing of the languages, which will be described later, and the like is connected to the system controller 11.

Figure 2:
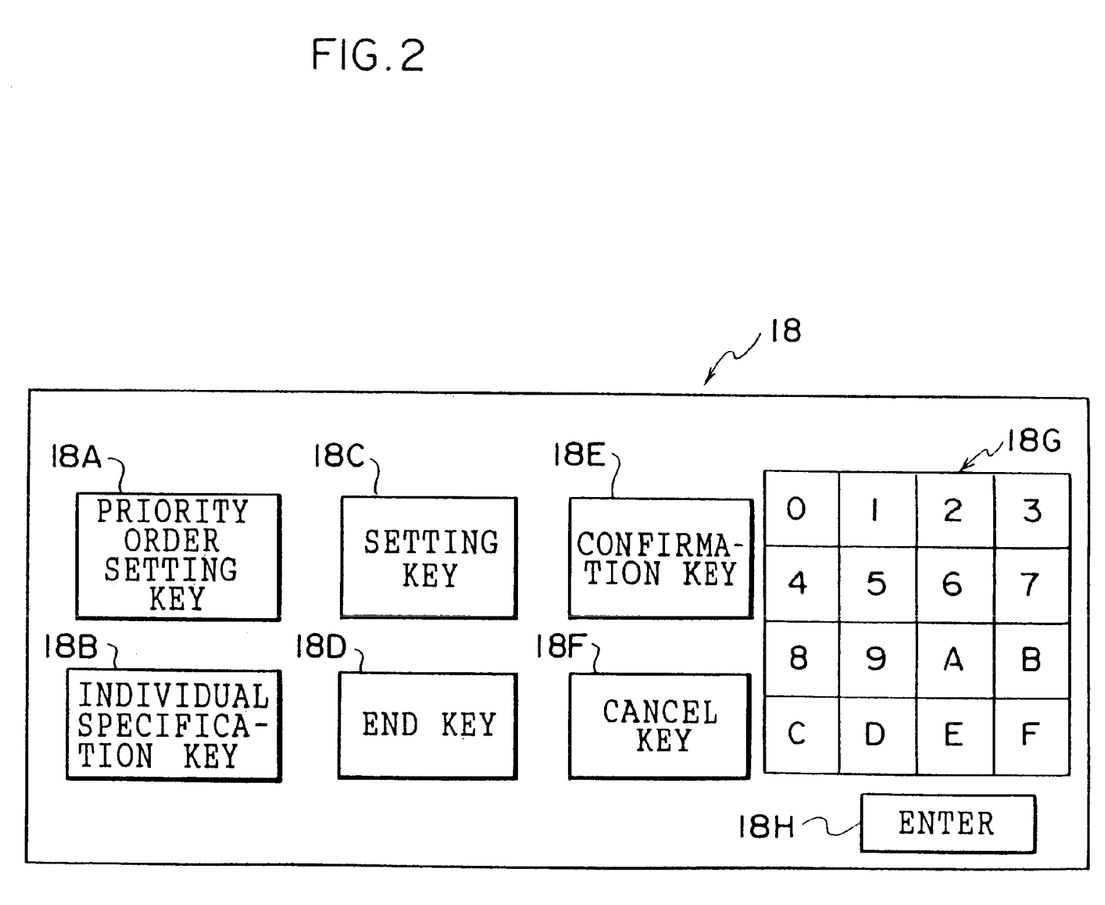
FIG. 2 is a structural view of an operation key portion.

As shown in FIG. 2, a priority order setting key 18A for starting the priority order setting processing of the languages which will be described later, an individual specification key 18B for starting individual priority order setting processing which will be described later, a setting key 18C for instructing setting (storage of entered data) in the priority order setting processing, an end key 18D for indicating an end of the priority order setting processing, a confirmation key 18E for confirming the present priority order set condition, a cancel key 18F for canceling the setting in the priority order setting processing, a hexadecimal entry key 18G for entering language codes corresponding to the desired languages, and an enter key 18H for determining the data entered by the hexadecimal entry key 18G are provided at the operation key portion 18.

Operation of the present embodiment will be described hereinafter.

Firstly, processing wherein an order of priority of the languages is set in advance (the priority order setting processing) will be described. Before the CD is reproduced by the CD player 10 for the first time or the like, the user sets the order of priority of the languages for the displaying on the LCD 19 of the character information recorded on the CD. When the user presses the priority order setting key 18A of FIG. 2, execution of the priority order setting processing of FIG. 6 is started by the system controller 11.

Figure 6:
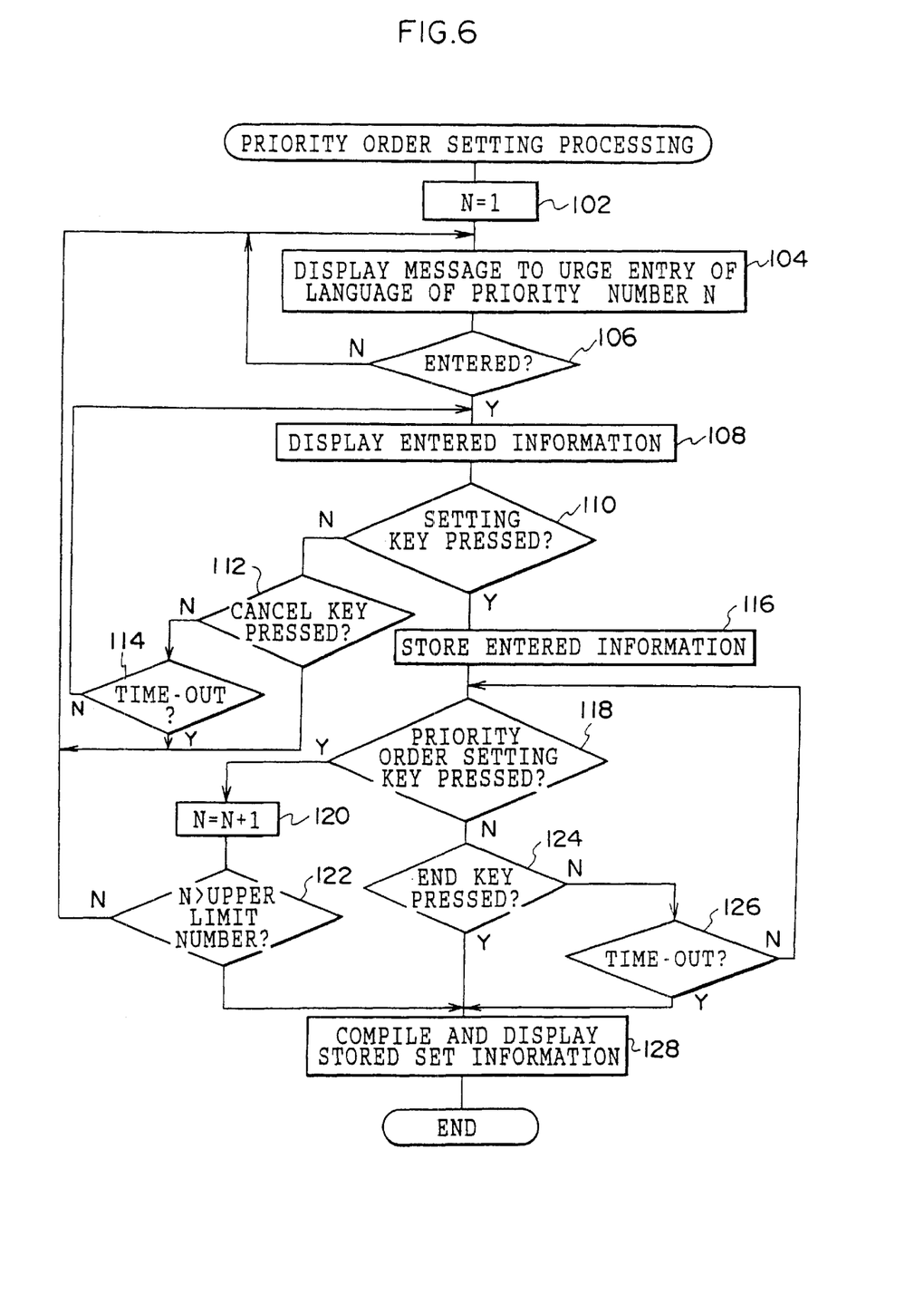
FIG. 6 is a flow chart illustrating a control routine of the priority order setting processing.

In step 102 of FIG. 6, a counter N representing the priority number is initialized to "1". In subsequent step 104, as shown in FIG. 3A, a message to urge entry of the language of priority number N (1, if it is the first time) is displayed on the LCD 19, which is followed by subsequent step 106, where entry from the user is awaited.

At this point, the user enters his desired language by utilizing an internationally common code (referred to as a language code, hereinafter) that is established in advance in correspondence to each language. For example, if entry of Japanese is desired, "69" (the hexadecimal number) corresponding to "Japanese" is entered as shown in FIG. 3B. Specifically, "69" is entered by the hexadecimal entry key 18G, and then the enter key 18H is pressed to conclude the operation.

Figure 3A:
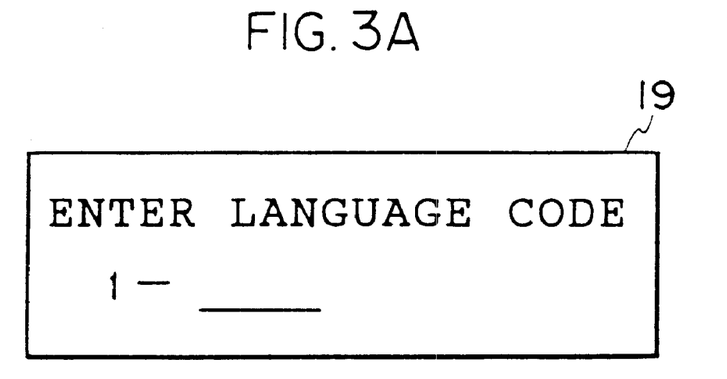
FIG. 3A is a diagram illustrating a transition of the contents displayed on a LCD when setting a language with the first priority, before a language code has been entered.
Figure 3B:
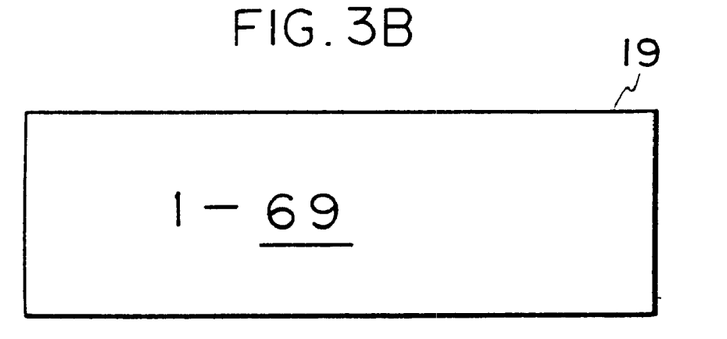
FIG. 3B is a diagram illustrating a transition of the contents displayed on the LCD when setting the language with the first priority, immediately after the language code has been entered.

The language codes of the languages that are expected to be entered by the user may be displayed together with the above-mentioned message in step 104, though they are not illustrated in FIG. 3A. For example, if "Japanese: 69, English: 09, Chinese: 75" is displayed, the user who wants to enter Japanese need not be informed in advance that the Japanese language code is "69".

Figure 3C:
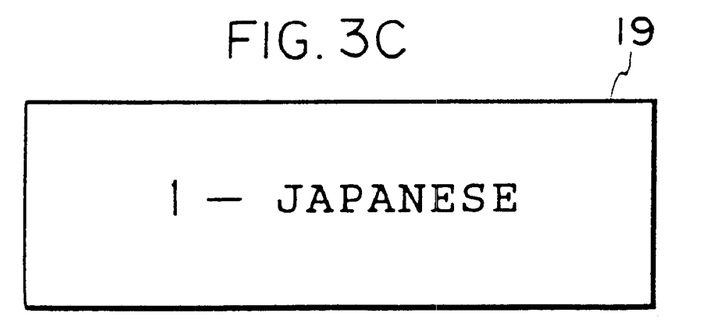
FIG. 3C is a diagram illustrating a transition of the contents displayed on the LCD when setting the language with the first priority, after the entered language code has been interpreted.

When the user enters his desired language code in the same manner as above, the process moves to step 108 where the entered language code is interpreted so that the name of the language corresponding to the language code is displayed on the LCD 19. For example, when "69" is entered as shown in FIG. 3B, "Japanese", which corresponds to "69", is displayed as shown in FIG. 3C. The user who sees the display either presses the setting key 18C of FIG. 2 if the setting is correct, or presses the cancel key 18F of FIG. 2 to cancel the setting.

At this point, when the user presses the setting key 18C (i.e., when the answer to the determination in step 110 is affirmative), the process moves to step 116 where the entered information is stored. (In the example of FIG. 3C, the information "Japanese is the first priority" is stored.) Then, when the user presses the priority order setting key 18A again (i.e., when the answer to the determination in step 118 is affirmative), the counter N is incremented by 1 (step 120). After it is determined that the counter N is not larger than a specified upper limit number (for example, "8")(step 122), the process returns to step 104.

Figure 4A:
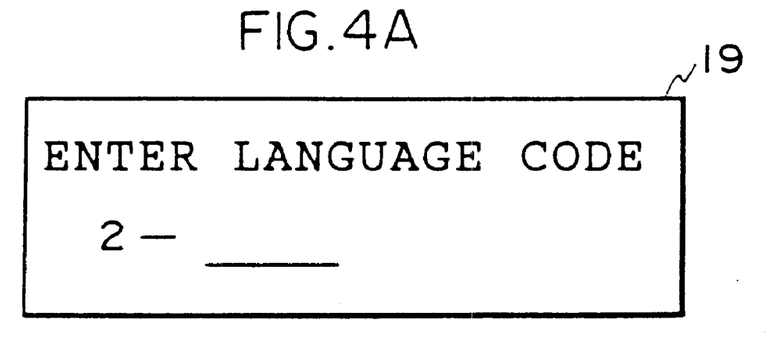
FIG. 4A is a diagram illustrating a transition of the contents displayed on a LCD when setting a language with the second priority, before a language code has been entered.
Figure 4B:
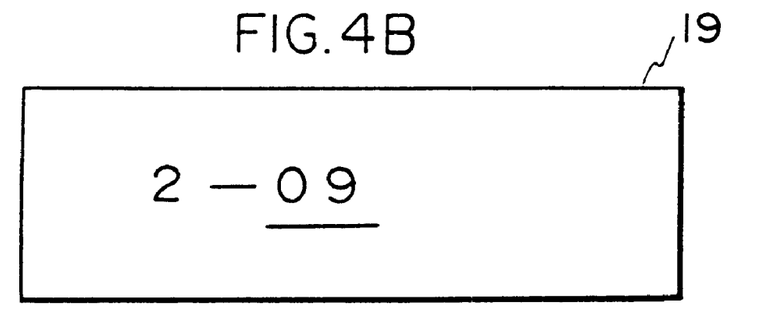
FIG. 4B is a diagram illustrating a transition of the contents displayed on the LCD when setting the language with the second priority, immediately after the language code has been entered.
Figure 4C:
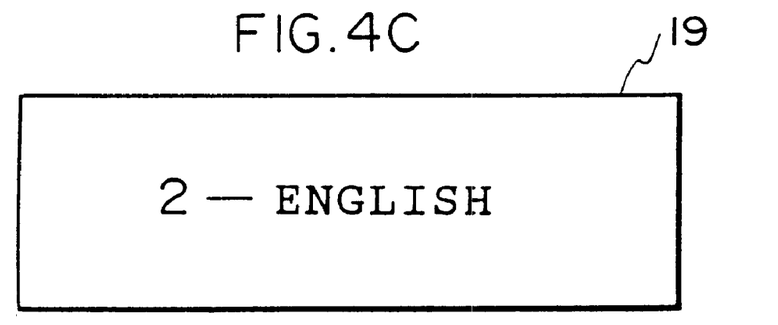
FIG. 4C is a diagram illustrating a transition of the contents displayed on the LCD when setting the language with the second priority, after the entered language code has been interpreted.

In step 104, a message to urge entry of the language whose priority number N (2 for this time) is displayed on the LCD 19 (see FIG. 4A). Subsequently, from step 106 onward, the setting of the languages of priority number N is carried out in the same manner. For example, if entry of English as the second priority language is desired, "09" (the hexadecimal number), which corresponds to "English", is entered as shown in FIG. 4B. Thus, as shown in FIG. 4C, "English", which corresponds to "09", is displayed. Then, English is set as the second priority when the user presses the setting key 18C.

In this way, setting of the languages, from that of the first priority number to that of the above-mentioned upper limit number, can be successively carried.

On the other hand, when the user presses the cancel key 18F after seeing the entry result displayed in step 108 (in a case where the answer to the determination in step 112 is affirmative), or when a predetermined length of time or more has elapsed since the start of the display of the entry result (in a case where the answer to the determination in step 114 is affirmative), it is considered that the entry result is to be cancelled. Therefore, the process returns to step 104 where a message to urge entry of the language of priority number N (in this case, 1 again) is displayed on the LCD 19. Subsequently, processing from the step 106 onward is carried out in the same manner.

Figure 5:
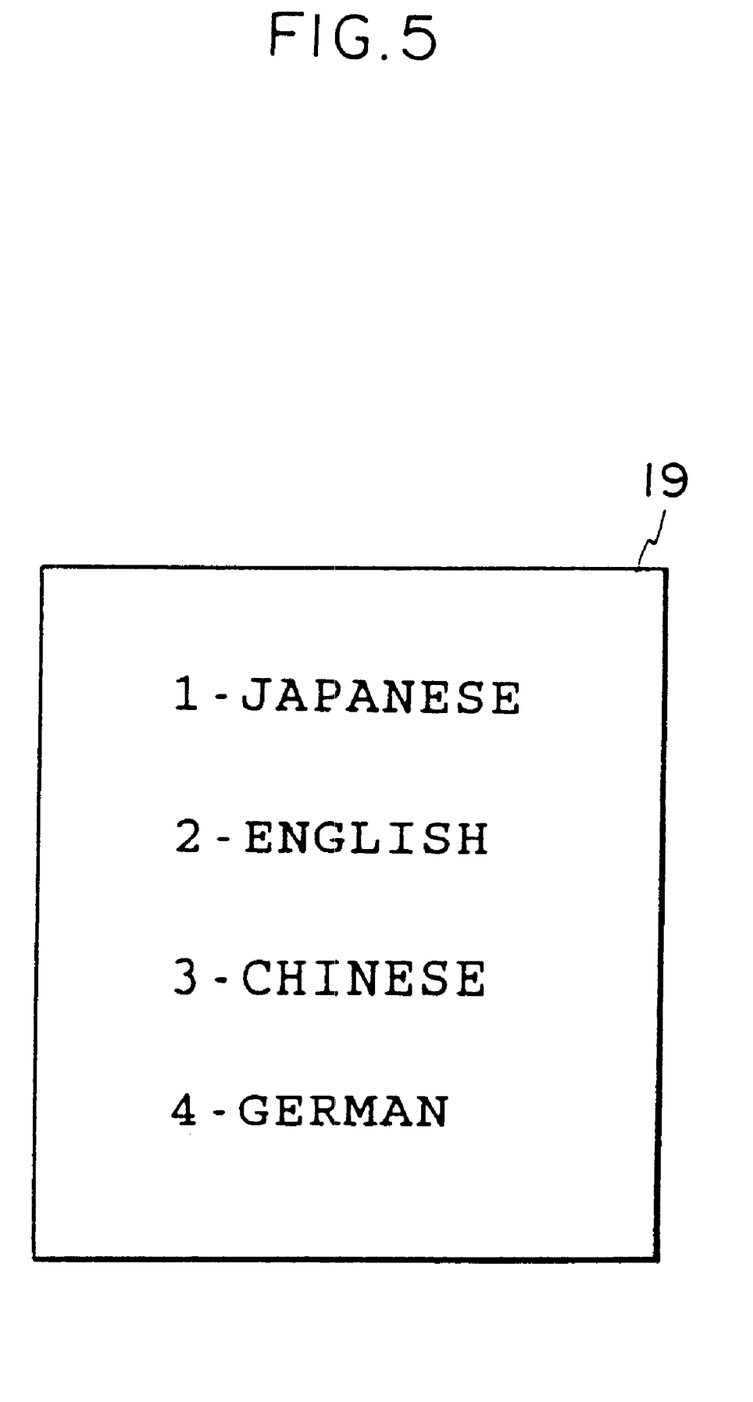
FIG. 5 is a diagram illustrating an example of a display wherein setting results depending upon priority order setting processing are compiled and displayed.

In the meantime, after the entered information is stored in step 116, if the user presses the end key 18D (in a case where the answer to the determination in step 124 is affirmative), if a predetermined length of time or more has elapsed with neither the priority order setting key 18A nor the end key 18D being pressed (in a case where the answer to the determination in step 126 is affirmative), or if setting of priorities up to the upper limit number has been completed (in a case where the answer to the determination in step 122 is affirmative), the process moves to step 128 where the stored set information is compiled and displayed on the LCD 19 as shown in FIG. 5. Then, the processing is terminated.

In this way, as the set information is compiled and displayed at the end, the user can confirm all the set information at once. The priority order set condition at that point of time can be confirmed, where necessary, by pressing the confirmation key 18E.

Subsequently, character information display control processing wherein the reproduction of the CD 17 is carried out in the CD player 10 will be described. When the user sets the CD 17 in the predetermined position and operates an unillustrated reproduction button, execution of a control routine illustrated in FIG. 7 is started by the system controller 11.

Figure 7:
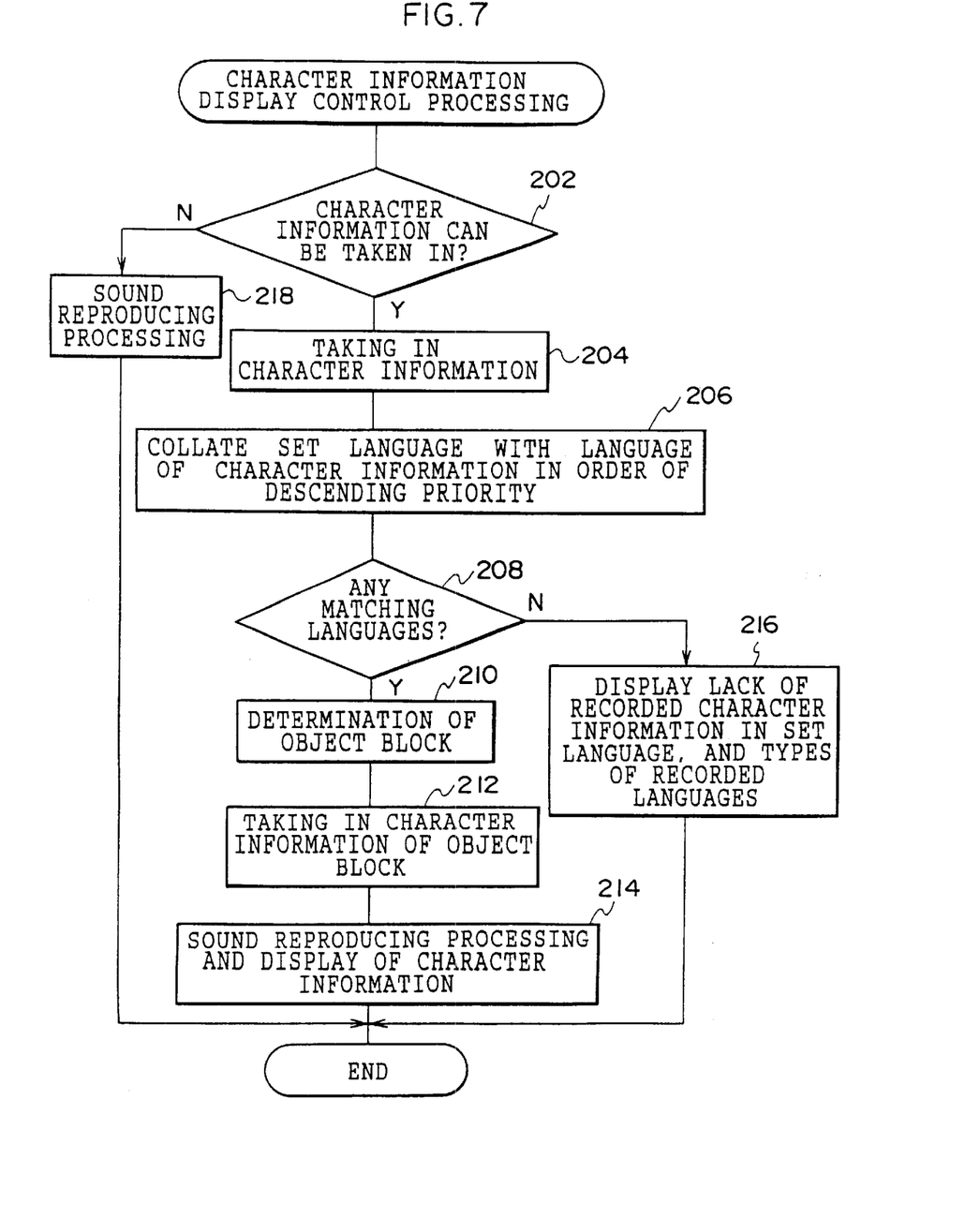
FIG. 7 is a flow chart illustrating a control routine of character information display control processing at the time of reproduction of a CD.

In step 202 of FIG. 7, it is determined whether or not the character information is recorded on the CD 17 and can be taken in in a normal manner. At this point, when the character information cannot be taken in due to the factors such as the character information not being recorded on the CD 17, the process moves to step 218 where normal sound reproducing processing is carried out.

If in step 202 it is determined that the character information can be taken in, the process moves to step 204 where information with regard to the languages of the character information recorded on the CD 17 is taken in. In subsequent step 206, the languages that are set are collated with the languages in which the character information is recorded on the CD 17, in the order of descending priority established in the priority order setting processing described above.

When a result of this collation reveals that one or more of the set languages matches one or more of the languages of the character information, the answer to the determination in step 208 is affirmative. Then, the process moves to step 210, where the language with the highest priority among the matched languages is considered to be the language to be displayed and the area (block) on which the character information in the language is recorded is determined as an object block. Subsequently, in next step 212, the character information of the object block is taken in. In subsequent step 214, the taken-in character information (the character information represented by the language with the highest priority) is displayed on the LCD 19 in concurrence with execution of the sound reproducing processing.

In this way, according to the present embodiment, among the character information recorded on the CD 17, the character information represented by the language with the highest priority can be displayed on the LCD 19 on the basis of the order of priority set in advance. Moreover, advance setting of the order of priority obviates the need to set the order of priority each time the CD 17 is set for reproduction, thereby allowing the character information to be displayed in the language desired by the user without increasing the burden on the user.

When the result of collation in step 206 reveals none of the set languages matches the languages of the character information, the answer to the determination in step 208 is negative and the process moves to the step 216 where the lack of the character information in the languages set by the priority order setting processing, and the types of languages in which the character information is recorded on the CD 17, are displayed on the LCD 19. Thus, the user can recognize instantly the fact that the character information can not be displayed and the types of languages in which the character information is recorded on the CD 17.

In the meantime, the CD player 10 of the present embodiment is provided with a function for individually specifying the languages of the character information to be displayed. When the user presses the individual specification key 18B of FIG. 2, execution of the individual priority order setting processing for setting the order of priority that is effective only during the reproduction concerned is started by the system controller 11. As contents of the individual priority order setting processing are the same as those of the above-mentioned priority order setting processing of FIG. 6, description thereof will be omitted.

The order of priority that is set by the individual priority order setting processing overrides the order of priority that is set in advance, and is effective when the CD 17 is reproduced after the setting but is nullified with a predetermined timing (for example, when the CD player 10 is turned off or when the CD 17 is changed).

Thanks to the individual priority order specification function of this type, even if the character information represented by the languages that are set in the order of priority in advance is not recorded on the CD 17, for example, the user can individually specify a language among the language types displayed in above step 216 so as to allow the character information represented by the specified language to be displayed.

By setting a default language for displaying the character information during manufacture of the CD player 10, the character information in the default language may be displayed when the character information in the languages set in the order of priority of the user is not recorded on the CD 17.

Further, in the priority order setting processing, it is not essential to use the internationally common codes established in advance in entering the desired languages. A code that is independently assigned for each language, for example, "Japanese: A, English: B, Chinese: C" may be used.

In addition, the display for displaying the character information and various messages is not limited to the LCD, and other displays such as conventional displays utilizing a CRT (cathode ray tube) can also be applied.

Industrial Applicability

Manufacturers of the sound reproducing device in accordance with the present invention are able to manufacture the sound reproducing device that can display the character information in the languages desired by the user without increasing the burden on the user.

What is claimed is:

1. A sound reproducing device intended for a recording medium on which sound information and character information represented by one or more languages are recorded so that the sound information is reproduced and the character information is displayed on a display portion, comprising:

priority order setting means for setting in advance an order of priority of languages in which the character information is displayed; and control means for displaying the character information on the display portion by reading out the character information from the recording medium on a basis of the order of priority set by said priority order setting means.

2. A sound reproducing device according to claim 1, wherein an internationally common code established in advance in correspondence to each language is used when the order of priority of the languages is set by said priority order setting means.

3. A sound reproducing device according to claim 2, wherein said control means displays on the display portion a purport that the character information cannot be displayed when the character information represented by the languages specified in the order of priority is not recorded on the recording medium.

4. A sound reproducing device according to claim 3, further including an individual specification means for individually specifying the languages in which the character information is displayed, wherein, when the languages are individually specified by said individual specification means, said control means gives precedence to the individually specified languages over the order of priority in reading out the character information from the recording medium and displaying the character information.

5. A sound reproducing device according to claim 4, wherein the recording medium is a compact disc.

6. A sound reproducing device according to claim 3, wherein the recording medium is a compact disc.

7. A sound reproducing device according to claim 2, wherein, when the character information represented by the languages specified in the order of priority is not recorded on the recording medium, said control means displays on the display portion types of languages in which the character information is recorded on the recording medium.

8. A sound reproducing device according to claim 7, further including an individual specification means for individually specifying the languages in which the character information is displayed, wherein, when the languages are individually specified by said individual specification means, said control means gives precedence to the individually specified languages over the order of priority in reading out the character information from the recording medium and displaying the character information.

9. A sound reproducing device according to claim 8, wherein the recording medium is a compact disc.

10. A sound reproducing device according to claim 7, wherein the recording medium is a compact disc.

11. A sound reproducing device according to claim 2, further including an individual specification means for individually specifying the languages in which the character information is displayed, wherein, when the languages are individually specified by said individual specification means, said control means gives precedence to the individually specified languages over the order of priority in reading out the character information from the recording medium and displaying the character information.

12. A sound reproducing device according to claim 11, wherein the recording medium is a compact disc.

13. A sound reproducing device according to claim 2, wherein the recording medium is a compact disc.

14. A sound reproducing device according to claim 1, wherein said control means displays on the display portion a purport that the character information cannot be displayed when the character information represented by the languages specified in the order of priority is not recorded on the recording medium.

15. A sound reproducing device according to claim 14, further including an individual specification means for individually specifying the languages in which the character information is displayed, wherein, when the languages are individually specified by said individual specification means, said control means gives precedence to the individually specified languages over the order of priority in reading out the character information from the recording medium and displaying the character information.

16. A sound reproducing device according to claim 15, wherein the recording medium is a compact disc.

17. A sound reproducing device according to claim 14, wherein the recording medium is a compact disc.

18. A sound reproducing device according to claim 1, wherein, when the character information represented by the languages specified in the order of priority is not recorded on the recording medium, said control means displays on the display portion types of languages in which the character information is recorded on the recording medium.

19. A sound reproducing device according to claim 18, further including an individual specification means for individually specifying the languages in which the character information is displayed, wherein, when the languages are individually specified by said individual specification means, said control means gives precedence to the individually specified languages over the order of priority in reading out the character information from the recording medium and displaying the character information.

20. A sound reproducing device according to claim 19, wherein the recording medium is a compact disc.

21. A sound reproducing device according to claim 18, wherein the recording medium is a compact disc.

22. A sound reproducing device according to claim 1, further including an individual specification means for individually specifying the languages in which the character information is displayed, wherein, when the languages are individually specified by said individual specification means, said control means gives precedence to the individually specified languages over the order of priority in reading out the character information from the recording medium and displaying the character information.

23. A sound reproducing device according to claim 22, wherein the recording medium is a compact disc.

24. A sound reproducing device according to claim 1, wherein the recording medium is a compact disc.

* * * * *